Patented June 8, 1926.                                    1,588,179

UNITED STATES PATENT OFFICE.

ERNST FRIEDERICH, OF BERLIN-CHARLOTTENBURG, GERMANY, ASSIGNOR, BY MESNE ASSIGNMENTS, TO GENERAL ELECTRIC COMPANY, OF SCHENECTADY, NEW YORK, A CORPORATION OF NEW YORK.

LEADING-IN WIRE FOR GLASS VESSELS.

No Drawing. Application filed August 30, 1921, Serial No. 496,943, and in Germany February 10, 1916.

(GRANTED UNDER THE PROVISIONS OF THE ACT OF MARCH 3, 1921, 41 STAT. L., 1313.)

As a leading-in wire for incandescent lamps, platinum was formerly employed almost exclusively. Subsequently recourse was had to the use of compound wires having a core of base metal, such as a nickel-iron alloy and a covering or surface of platinum. These wires were in use for a long time, until finally it was found that compound wires with a covering or shell of certain metals with a coefficient of expansion greater than that of glass, such as copper, for example, can be fused into glass satisfactorily if the covering or shell is placed on a core of such low coefficient of expansion that the total expansion of the compound wire is about equal to that of glass. The manufacture of these copper covered wires is difficult, comparatively much more so than the manufacture of a homogeneous wire, by reason of the difficulty of applying the cover to the core, of soldering the cover air tight to the core, and of the exactness and accuracy required in determining the diameter of the core and of the cover. Efforts have already been made to employ homogeneous wire, such as chromium-iron wire, which, however, did not fulfill the expectations founded upon it, since it does not adhere to the glass well and makes a poor seal. The known alloys of iron and nickel behave in a similar manner and also have so great a tendency to form air bubbles and air passages that they are not usable without a coating of platinum or copper.

One object of the invention is to produce homogeneous leading-in wires of iron or cobalt alloys, which do not have this defect of poor adhesion to the glass. Another object is to provide a homogeneous wire which does not form air bubbles in the glass when sealed into it. To these ends the leading-in wires consist of alloys of iron or cobalt with molybdenum or tungsten or both, or of alloys of iron and cobalt, to which again molybdenum or tungsten or both may be added. For example, wires may be made consisting of a good deal of tungsten or molybdenum and a little cobalt. By the admixture of the cobalt, the excessively low coefficient of expansion of the tungsten or molybdenum is heightened until the alloy may be made approximately the same coefficient of expansion as the glass to be employed. In general, however, alloys containing iron as the main component give the best results, and the addition of molybdenum, tungsten or cobalt, even in small quantities, to the iron lowers the coefficient of expansion until it approximates that of platinum. Other metals, such for example as nickel and manganese, do not have this remarkable property of lowering the coefficient of expansion of iron when used in equally large proportions as tungsten or molybdenum, but instead an addition of these metals to iron may cause a marked increase in the expansion.

The following compositions have been found satisfactory: 90% iron and 10% molybdenum; 85% iron and 15% cobalt; 85% iron and 15% tungsten. Particularly good results are obtained if to the iron a number of the metals named are added simultaneously, for example, cobalt and tungsten or molybdenum and cobalt. It is a remarkable fact that by the simultaneous admixture of a number of metals, the expansion is lowered much more than would correspond to the algebraic sum of the actions of the individual metals. For incandescent lamps made of lead-glass, some specially adapted alloys are:—80% iron, 10% cobalt, 10% molybdenum; and 75% iron, 10% cobalt, 15% tungsten. The results are substantially independent of small variations in the composition. This slight degree of sensitiveness is a very great advantage, and much facilitates the method of operation. These alloys are so pre-eminently adapted for the purpose that they are not inferior to pure platinum.

The manufacture of the alloys may be effected in ways already known. Slight impurities consisting of other materials that may happen to be present do no harm. Small admixtures of metals, such as silver or copper, are of advantage as increasing the ductility.

It has been found that in an alloy of the metals iron cobalt, molybdenum and tungsten, in which iron, for example, is present, the other metals, even in small amounts, have a great influence upon the coefficients of expansion. This favorable action of these three metals, cobalt, tungsten and molybdenum, shows itself not only in their alloys with iron or with each other, but also in their alloys with large quantities of other metals. Consequently, in the alloys above mentioned, the iron may be replaced more or less completely by other metals, for example, manganese.

It has also been found that all the known alloys which have approximately the same expansion as the glass which is to be used may be used as basic substances in place of iron. Such known alloys are, for example, nickel-iron and chromium-iron. If to these two alloys small quantities of tungsten, of molybdenum or of cobalt are added, then a very striking phenomenon makes itself apparent. While the wires made from these alloys without this addition are surrounded, after being sealed in, by a great quantity of small air bubbles in the glass, the wires made of alloys with admixtures of any of these three metals are almost entirely free from bubbles. This striking phenomenon is shown even when there are small percentages, such as 5% of the added metal. In general however it is better to select an admixture of about 10% of one of these three metals, in order to secure a uniformly good effect, regardless of the sealing in temperature. This desirable effect is produced also if, instead of one of these three metals, two or all three of them are employed as additions.

It will thus be seen that the elements, iron and manganese, possess characteristics by virtue of which either may be substituted for the other for the purpose of my invention and may be considered as belonging to one group. For the purpose of this specification, this group I will designate as the iron group. Similarly, the elements tungsten, cobalt and molybdenum, possess characteristics by virtue of which, for the purpose of my invention, one may be substituted for the other and these elements, for the purpose of this specification, will be designated as the tungsten group. In the same way, the elements nickel and chromium, may be substituted one for the other, for the purpose of my invention, and in this specification will be designated as the nickel group.

What I claim as new and desire to secure by Letters Patent of the United States, is,—

1. A lead-in wire consisting substantially of an alloy of one of the elements of the iron group herein described with one of the elements of the tungsten group herein described, said alloy having a coefficient of expansion adapting it for use in connection with glass.

2. A lead-in wire consisting substantially of an alloy of iron with one of the metals of the tungsten group herein described, in which alloy the iron content exceeds 65 per cent.

3. A lead-in wire consisting of an alloy of iron with tungsten having a coefficient of expansion within close range of the coefficient of expansion of glass.

4. A lead-in wire consisting of an alloy of iron with tungsten in which alloy the iron content exceeds 65 per cent.

In testimony whereof I affix my signature.

ERNST FRIEDERICH.